(12) United States Patent
Kim et al.

(10) Patent No.: US 9,593,765 B2
(45) Date of Patent: Mar. 14, 2017

(54) SMART TOUCH TYPE ELECTRONIC AUTO SHIFT LEVER

(71) Applicant: Hyundai Motor Company, Seoul (KR)

(72) Inventors: Eun Sik Kim, Gwangmyeong-si (KR); Jeongseop Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 533 days.

(21) Appl. No.: 14/099,757

(22) Filed: Dec. 6, 2013

(65) Prior Publication Data

US 2014/0318295 A1   Oct. 30, 2014

(30) Foreign Application Priority Data

Apr. 29, 2013   (KR) .......... 10-2013-0047261

(51) Int. Cl.
*F16H 59/08*   (2006.01)
*F16H 63/42*   (2006.01)

(52) U.S. Cl.
CPC ....... *F16H 59/08* (2013.01); *F16H 2063/423* (2013.01); *Y10T 74/2003* (2015.01)

(58) Field of Classification Search
CPC .. F16H 59/08; Y10T 74/2014; Y10T 74/2003; B60K 2350/1024; B60K 2350/1028
See application file for complete search history.

(56) References Cited

U.S. PATENT DOCUMENTS

| 7,406,889 B2 * | 8/2008 | Okawa | F16H 63/42 |
| | | | 74/335 |
| 2012/0041655 A1 * | 2/2012 | Thooris | F16H 59/02 |
| | | | 701/52 |
| 2014/0020496 A1 * | 1/2014 | Heo | F16H 59/044 |
| | | | 74/473.12 |
| 2014/0149909 A1 * | 5/2014 | Montes | B60K 35/00 |
| | | | 715/771 |
| 2015/0066316 A1 * | 3/2015 | Fujii | F16H 61/0213 |
| | | | 701/51 |

FOREIGN PATENT DOCUMENTS

| JP | 2006-177401 A | 7/2006 |
| JP | 2006-313002 A | 11/2006 |
| KR | 10-2013-0015362 A | 2/2013 |
| KR | 10-1410664 B1 | 6/2014 |

* cited by examiner

*Primary Examiner* — Victor MacArthur
(74) *Attorney, Agent, or Firm* — Morgan, Lewis & Bockius LLP (57) ABSTRACT

An electronic auto shift lever, and more particularly, a smart touch type electronic auto shift lever configures a shift operating unit of the auto shift lever. The auto shift lever includes a touch screen and provides a predetermined shift pattern to a user to perform a shift operation by an input through the touch screen, in which the user is allowed to arbitrarily change the shift pattern to provide various shift patterns corresponding to a user's taste, in an auto shift lever of an automatic transmission vehicle.

13 Claims, 11 Drawing Sheets

SMART TOUCH TYPE ELECTRONIC AUTO SHIFT LEVER

CROSS-REFERENCE TO RELATED APPLICATIONS

The present application claims priority of Korean Patent Application Number 10-2013-0047261 filed Apr. 29, 2013, the entire contents of which application is incorporated herein for all purposes by this reference.

BACKGROUND OF INVENTION

Field of Invention

The present invention relates to an electronic auto shift lever, and more particularly, to a smart touch type electronic auto shift lever that configures a shift operating unit of the auto shift lever including a touch screen and provides a predetermined shift pattern to a user to perform a shift operation by an input through the touch screen, in which the user is allowed to arbitrarily change the shift pattern to provide various shift patterns corresponding to a user's taste, in a shift operating unit of an auto shift lever.

Description of Related Art

In general, a shift lever provided in a vehicle in order to control a shift stage of the vehicle includes a mechanical shift lever and an electronic shift lever, and in recent years, there has been a tendency that the electronic shift lever is increasingly used.

The electronic shift lever between the mechanical shift lever and the electronic shift lever is generally placed in a console inside a vehicle driver seat, but the lever protrudes to the top of the console, and as a result, the user easily operates the electronic shift lever. Such a configuration provides an operating touch similar to the conventional mechanical shift lever to allow the user to easily control the shift stage.

Figure 1:
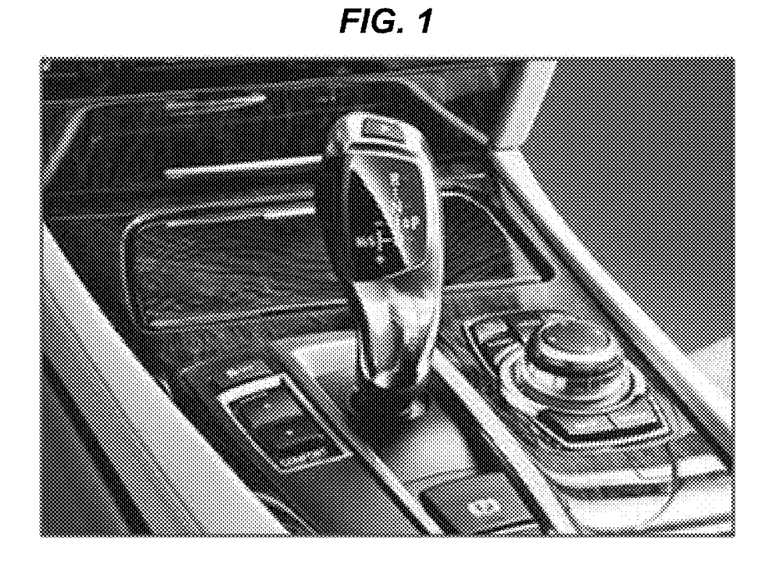
FIG. 1 illustrates one example of a conventional electronic shift lever.
Figure 2:
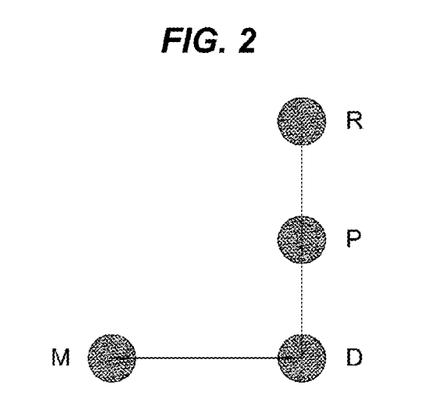
FIG. 2 illustrates a shift pattern of a conventional linear-operation electronic shift lever.
Figure 3:
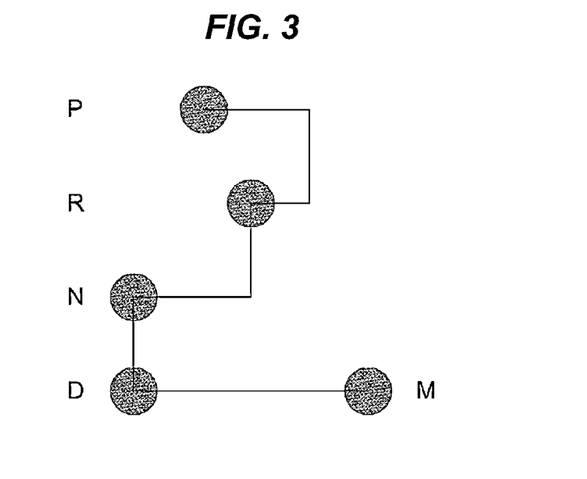
FIG. 3 illustrates a shift pattern of a conventional gate-type mechanical shift lever.

FIG. 1 illustrates one example of a conventional electronic shift lever. FIG. 2 illustrates a shift pattern of a conventional linear-operation electronic shift lever. FIG. 3 illustrates a shift pattern of a conventional gate-type mechanical shift lever.

As illustrated in the figures, the conventional electronic shift lever has a shift pattern which has a relatively simple linear form as compared with the shift pattern of the conventional mechanical shift lever of the gate type. The conventional electronic shift lever additionally includes a button unit that controls a P stage to make the shift pattern be simpler than the shift pattern of the conventional mechanical shift lever.

However, the conventional electronic shift lever configured as above has problems described below.

The shift lever is fixed to the console, and as a result, it is difficult to operate the shift lever at a desired position.

The shift pattern of the shift lever is fixed to a predetermined form, in general, a linear operation form, and as a result, it is impossible to respond to demands of various users who desire an operation familiar with the conventional mechanical shift pattern.

The shift pattern is similar to the shift pattern of the conventional mechanical shift lever (a method in which the lever is operated forwards and backwards), and as a result, it is difficult to feel an advantage in introduction of the electronic shift lever.

Since a space occupied by the electronic shift lever is large, that is, the shift lever needs to be moved by the shift pattern, a predetermined space capable of receiving the shift pattern needs to be allocated, and as a result, an in-vehicle space, for example, a storing space such as a cup holder, or the like is small and a space for required button functions is insufficient.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a smart touch type electronic auto shift lever that configures a shift operating unit of the auto shift lever including a touch screen and provides a predetermined shift pattern to a user to perform a shift operation by an input through the touch screen, in an auto shift lever of an auto transmission vehicle, in which the user is allowed to arbitrarily change the shift pattern to provide various shift patterns corresponding to a user's taste.

Various aspects of the present invention provide for a smart touch type electronic auto shift lever, including: a touch screen placed on a console of a vehicle; and a shift stage controlling unit generating shift pattern information and transmitting the generated shift pattern information to the touch screen and controlling stage shifting of an electronic auto transmission of the vehicle to correspond to input information input from the touch screen, wherein the shift stage controlling unit previously sets and stores shift stage information including P, R, N, D, M, +, and − stages, positional information including positions where the shift stages included in the shift stage information are to be displayed, and relative positional information among the respective stages, which are included in the shift stage information, the relative positional information being set such that the P, R, N, D, and M stages are sequentially placed, the shift stage controlling unit generates shift pattern information based on the shift stage information, the positional information, and the relative positional information and transmits the generated shift pattern information to the touch screen, the touch screen displays the shift pattern information received from the shift stage controlling unit and transmits input information to the shift stage controlling unit when a touch input occurs, and the shift stage controlling unit generates stage shift information allocated corresponding to the input information received from the touch screen and transmits the generated stage shift information to a control unit of the electronic auto transmission of the vehicle.

The shift stage controlling unit may generate and output stage shift information corresponding to a finally input shift stage only when the input information received from the touch screen is sequentially input according to placement of the shift stage from any one of the P, R, N, D, and M stages which are sequentially placed.

The shift stage controlling unit may generate and output stage shift information corresponding to the R stage when the P and R stages are sequentially input, the shift stage controlling unit may generate and output stage shift information corresponding to the N stage when the P, R, and N stages are sequentially input, the shift stage controlling unit may generate and output stage shift information corresponding to the D stage when the P, R, N, and D stages are sequentially input, and the shift stage controlling unit may generate and output stage shift information corresponding to the M stage when the P, R, N, D, and M stages are sequentially input.

The shift stage controlling unit may set the relative positional information among the shift stages as first relative positional information and second relative positional information in advance, the shift stage controlling unit may set and store mode switching button information in advance and provide the mode switching button information to the touch screen, the touch screen may display a mode switching button based on the mode switching button information, and the shift stage controlling unit may cross-switch the relative positional information to any one of the first relative positional information and the second relative positional information when the mode switching button is input.

The shift stage controlling unit may set and store pattern changing button information in advance and provide the pattern changing button information to the touch screen, the touch screen may display the pattern changing button based on the pattern changing button information, and the shift stage controlling unit may control the shift pattern to be changed when the pattern changing button is input.

The shift stage controlling unit may set and store the pattern changing button information and the mode switching button information in advance and provide the pattern changing button information and the mode switching button information to the touch screen, the touch screen may display the mode switching button based on the mode switching button information and display the pattern changing button based on the pattern changing button information, and the shift stage controlling unit may determine that the pattern changing button and the mode switching button are not input when both the pattern changing button and the mode switching button are input.

The shift stage controlling unit may determine the touch input on the touch screen when the pattern changing button is input, the shift stage controlling unit may move the position of the shift stage corresponding to the position of an initial touch point to a final position of the touch point when a touch input of one point on the touch screen is present and the position of the corresponding touch point is moved, the shift stage controlling unit may increase the size of the shift stage when determining that touch inputs of two points on the touch screen are present and a distance between respective touch points is increased, and the shift stage controlling unit may decrease the size of the shift stage when determining that touch inputs of two points on the touch screen are present and the distance between respective touch points is decreased.

The shift stage controlling unit may determine the touch input on the touch screen when the pattern changing button is input, the shift stage controlling unit may move the position of the shift stage corresponding to the position of the initial touch point to the final position of the touch point when the touch input of one point on the touch screen is present and the pattern changing button is continuously input and the position of the corresponding touch point is moved, the shift stage controlling unit may increase the size of the shift stage when determining that touch inputs of two points on the touch screen are present and the pattern changing button is continuously input and the distance between respective touch points is increased, and the shift stage controlling unit may decrease the size of the shift stage when determining that touch inputs of two points on the touch screen are present and the pattern changing button is continuously input and the distance between respective touch points is decreased.

According to various aspects of the present invention, a shift operation of an electronic shift lever is achieved through a touch screen, and as a result, the structure of the electronic auto shift lever is simplified as compared with a configuration of a conventional auto shift lever, an operating touch is improved and input convenience is thus increased, and manufacturing cost can be reduced.

A shift pattern, the size, a position, and a placement of a shift button provided through the touch screen are arbitrarily changed by the user, and as a result, shift patterns according to different tastes of each user can be provided.

In the smart touch type electronic auto shift lever of the present invention, the operating unit is formed by the touch screen, and as a result, package performance can be improved by not requiring a volume occupied by a conventional shift lever. Accordingly, it is possible to increase a storing space in a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7($a$) and FIG. 7($b$) illustrate an exemplary stage shift process operated through a touch screen.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

According to the present invention, a shift operating unit of an electronic auto shift lever is configured by a touch screen instead of an existing shift lever, a predetermined shift pattern is provided to a user through the touch screen, and a shift operation is achieved through an input from the touch screen. Further, the shift pattern provided through the touch screen is arbitrarily changeable by a user to provide a shift pattern corresponding to a user's taste.

Figure 4:
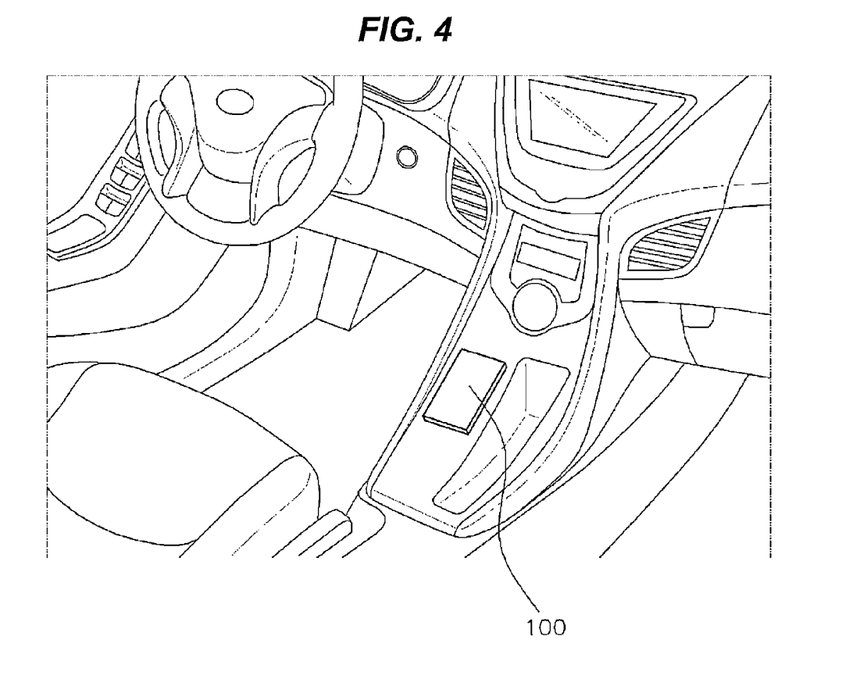
FIG. 4 illustrates a driver seat adopting an exemplary smart touch type electronic auto shift lever in accordance with the present invention.
Figure 5:
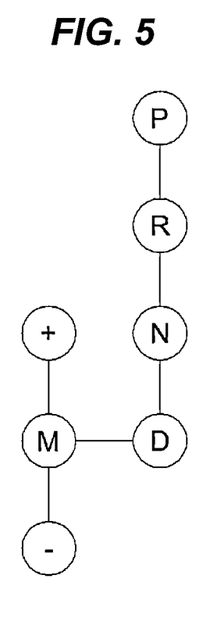
FIG. 5 illustrates a shift pattern provided through an exemplary smart touch type electronic auto shift lever in accordance with the present invention.

FIG. 4 illustrates an exemplary driver seat adopting a smart touch type electronic auto shift lever in accordance with various embodiments of the present invention. FIG. 5 illustrates a shift pattern provided through the smart touch type electronic auto shift lever of the present invention.

As illustrated, the smart touch type electronic auto shift lever 100 of the present invention generally includes an operating unit in which an input means is configured by a known touch screen means instead of a shift lever of an electronic transmission positioned on a console in a vehicle.

A driver who drives a vehicle adopting the smart touch type electronic auto shift lever 100 of the present invention touches and inputs shift stages displayed on touch screen means (hereinafter, referred to as a 'touch screen') instead of the known electronic shift lever to control stage shifting.

Accordingly, an interior of the vehicle adopting the present invention does not require an internal space occupied by a conventional shift lever as compared with a vehicle including a conventional auto shift lever, and as a result, a storing space may be increased in the vehicle and a space for a driver seat may be secured.

The smart touch type electronic auto shift lever 100 of the present invention includes a shift stage controlling unit connected with a control unit of the electronic auto transmission of the vehicle, and a touch screen placed on the console of the vehicle, connected with the shift stage controlling unit to receive and display shift pattern information from the shift stage controlling unit, and transmitting input information generated by a touch to the control unit.

The touch screen is placed on the console in the vehicle and may be placed at a position where the known electronic shift lever is placed. Accordingly, the touch screen is placed at a similar position as a driving habit of the driver who drives by using the conventional electronic shift lever to prevent the driver from being confused.

The touch screen may be configured to include any known touch screen displaying information, in which an input is achieved by touching a display surface, for example, any touch screen including a capacitive touch screen or a resistive touch screen.

The shift stage controlling unit as means provided to control the touch screen may be mounted inside the vehicle console where the touch screen is placed, but it is apparent to those skilled in the art that the present invention is not limited thereto.

The shift stage controlling unit may be configured to include a known electronic control unit (ECU) and may adopt any other known means provided to control the touch screen. Since this is a known matter, a detailed description thereof will be omitted.

The shift stage controlling unit may set in advance and store shift stage information including P, R, N, D, M, +, and − stages which are shift stages of the vehicle, positional information including positions where the shift stages included in the shift stage information will be displayed, and relative positional information among the respective stages included in the shift stage information.

Accordingly, the shift stage controlling unit is configured to generate the shift pattern information based on the shift stage information, the positional information, and the relative positional information and transmit the generated shift pattern information to the touch screen at the time of generating the shift pattern information.

When the shift pattern information transmitted through the shift stage controlling unit is displayed through the touch screen and an input from a user is performed through the displayed shift pattern information, the touch screen generates input information according to the user's input and transmits the input information to the shift stage controlling unit.

As a result, the shift stage controlling unit generates stage shift information allocated to the input information received from the touch screen and transmits the generated stage shift information to the control unit of the electronic auto transmission of the vehicle to finally achieve stage shifting.

Meanwhile, in various embodiments of the present invention, in the relative positional information among the respective shift stages included in the shift stage information stored by the shift stage controlling unit, the P, R, N, D, and M stages among the shift stages included in the shift stage information may be placed in sequence. This is illustrated in FIG. 5. Further, the + shift stage and the − shift stage may be placed to be opposite to each other based on the M stage.

The respective shift stages may be placed based on a placement illustrated in FIG. 5, that is, a placement corresponding to a placement structure of the shift stage provided by the conventional electronic shift lever, and the relative positional information is set in advance according to relative positions of the respective shift stages at the time of placing the shift stage.

Accordingly, the driver is induced to sequentially perform stage shifting from a predetermined shift stage to adjacent shift stages at the time of shifting the shift stages according to the placement of the shift stage.

Figure 6:
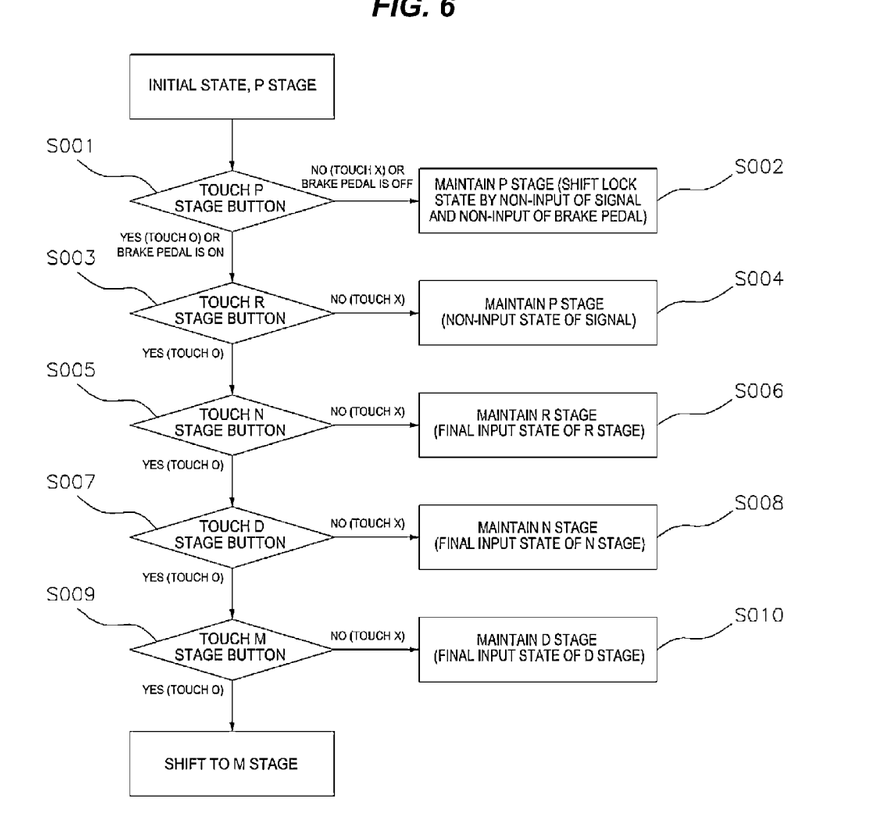
FIG. 6 is a flowchart illustrating an exemplary process of performing stage shifting of an exemplary smart touch type electronic auto shift lever in accordance with the present invention.
Figure 7A:
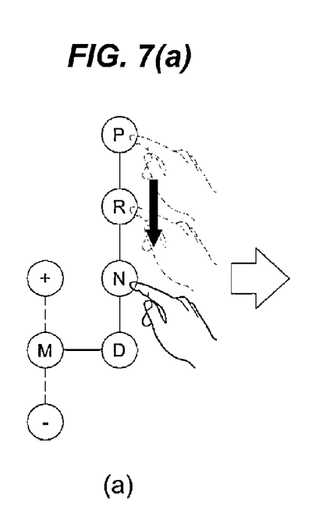
Figure 7B:
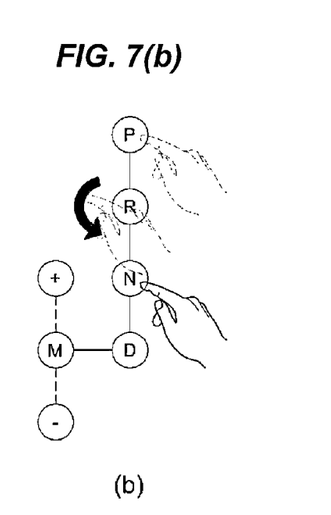

FIG. 6 is a flowchart illustrating various embodiments of a process of performing stage shifting of the smart touch type electronic auto shift lever of the present invention, which is configured as above. FIG. 7 illustrates a stage shift process operated through a touch screen.

As described above, in the case of the shift stage provided through the touch screen, the P, R, N, D, and M stages which are the shift stages of the vehicle are sequentially placed. In this case, the stage may be shifted only according to the sequence of the P, R, N, D, and M stages.

For example, when the driver intends to shift the stage from the P stage to the N stage, the shifting may be performed if the shift pattern is operated and input through the P stage, the R stage, and the N stage as illustrated in FIG. 7(a), however, the shifting cannot performed if the shift pattern is operated and input from the P stage to the N stage as illustrated in FIG. 7(b). This is to prevent unrequired stage shifting from being caused by a misinput of the touch screen and prevent confusion by making the conventional electronic shift pattern and shift process be the same.

To this end, a shift stage recognizing step in which the shift stage is recognized through the shift stage controlling unit is performed as follows.

In an initial shift stand-by state, the shift stage controlling unit of the present invention is set to perform shifting only when the P stage is initially input. Therefore, the shift stage controlling unit first determines whether the P stage is input (S001). In this case, it may be recognized that the P stage is input only when a brake pedal of the vehicle is input at the same time. That is, the conventional vehicle is configured such that the shifting is performed while stepping the brake pedal at the time of shifting the stage of the vehicle and by reflecting the configuration, the vehicle of the present invention is configured such that the shifting is performed when the input of the brake pedal and the input of the P stage are simultaneously performed.

When the P stage is not input or the brake pedal is not input in step S001, the shift stage controlling unit maintains the P stage which is the initial shift stage by non-input of the P stage and non-input of the brake pedal, and as a result, a shift lock state is maintained (S002).

On the contrary, when the input of the P stage and the input of the brake pedal are simultaneously performed in step S001, the shift stage controlling unit determines whether the R stage which needs to be sequentially input after the P stage and is a shift stage adjacent to the P stage is input (S003).

When the R stage is not input in step S003, the shift stage controlling unit regards that no shift stage is input after the P stage is input and maintains the P stage (S004).

On the contrary, when the R stage is input in step S003, the shift stage controlling unit determines whether the N stage which is an adjacent shift stage after the R stage is input (S005).

Up to the current step, the R stage is input through the touch screen, but the subsequent stage may be shifted, and as a result, when the N stage is not input in step S005 after stand-by for a predetermined time, it is regarded that the shift stage is not input after the R stage is input and the shift stage controlling unit shifts the shift stage which is maintained at the P stage to the R stage (S006).

On the contrary, when the N stage is input in step S005, the shift stage controlling unit determines whether the D stage which is an adjacent shift stage after the N stage is input (S007).

Up to the current step, the N stage is input, but the subsequent stage may be shifted, and as a result, when the D stage is not input in step S007 after stand-by for a predetermined time similarly as step S005, it is regarded that the shift stage is not input after the N stage is input and the shift stage controlling unit shifts the shift stage which is maintained at the P stage to the N stage (S008).

On the contrary, when the D stage is input in step S007, the shift stage controlling unit determines whether the M stage which is an adjacent shift stage after the D stage is input (S009).

Similarly as the above step, up to the current step, the D stage is input, but the subsequent stage may be shifted, and as a result, when the M stage is not input in step S009 after stand-by for a predetermined time, it is regarded that the shift stage is not input after the D stage is input and the shift stage controlling unit shifts the shift stage which is maintained at the P stage to the D stage (S010).

On the contrary, when the M stage is input in step S009, the shift stage controlling unit finally shifts the stage to the M stage (S011).

Similarly as the above step, the + and − stages placed adjacent to the M stage are shifted to the + or − stage depending on the input after the shift to the M stage and are again maintained at the M stage.

Meanwhile, in various embodiments of the present invention, the shift pattern set by the shift stage controlling unit is previously set to a conventional pattern array mode of the shift stage and a predetermined array mode, for example, a button mode, and may be easily changed by an operation through the touch screen.

Figure 8:
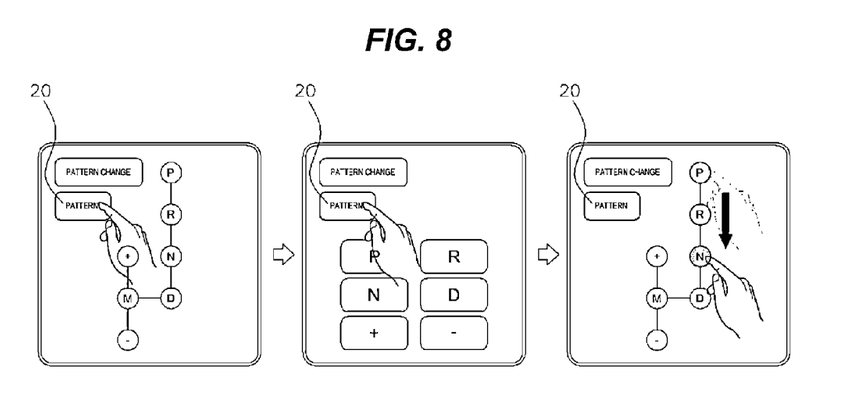
FIG. 8 is a schematic view illustrating switching of an exemplary shift pattern mode by a mode switching button.

To this end, the shift stage controlling unit further includes mode switching button information, and provides the mode switching button information to the touch screen to switch the current mode to any one of the predetermined array modes by a mode switching button 20 displayed on the touch screen.

The mode switching button information includes an image of the mode switching button 20 displayed on the touch screen illustrated in FIG. 8 and may include positional information to be displayed together. Therefore, the mode switching button 20 is displayed at a predetermined positioned on the touch screen, and as a result, a predetermined first mode (for example, a 'pattern mode', hereinafter, referred to as the 'pattern mode) is switched to a predetermined second mode (for example, a 'button mode', hereinafter, referred to as the 'button mode') in a touch input, thereby achieving switching among the respective modes of the shift pattern in the touch input.

In this case, the shift stage controlling unit sets the relative positional information among the shift stages to first relative positional information (for example, the conventional shift mode pattern) and second relative positional information (the button mode pattern) in advance, and cross-switches the relative positional information when inputting the mode switching button to achieve mode switching.

Figure 9:
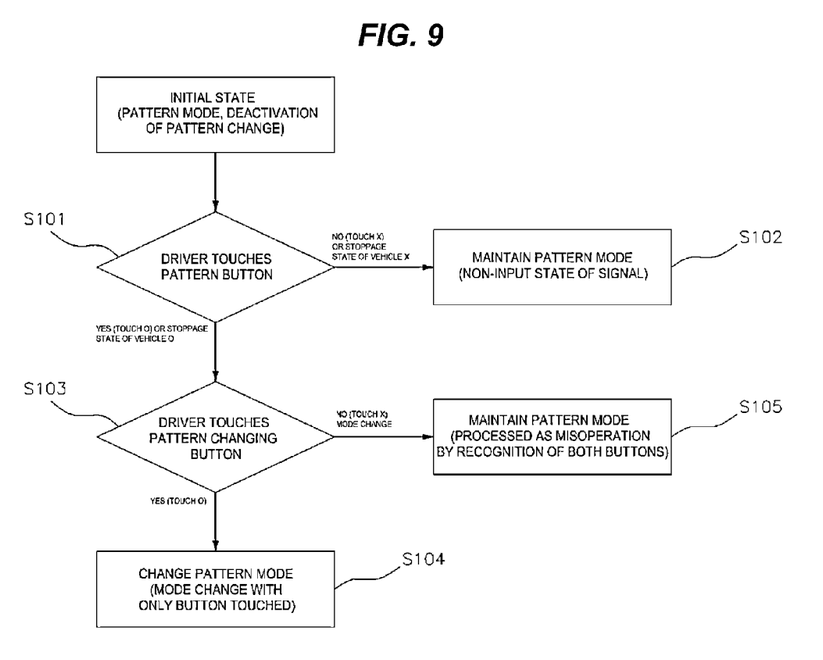
FIG. 9 is a flowchart illustrating an exemplary switching step of the shift pattern mode by the mode switching button.

The provided inter-mode switching is performed through steps below and is illustrated in FIG. 9.

First, an initial state, that is, the shift pattern provided in the pattern mode is maintained and while standing by for an input by the user, the shift stage controlling unit determines whether there is an input of the mode switching button 20 by the user (S101). In this case, it may be determined whether the vehicle is stopped together with the input of the mode switching button 20. The determination of the vehicle stopping state may use vehicle information such as a vehicle speed, and the like and since this is a known matter, a detailed description thereof will be omitted. Such a configuration of the present invention is to secure safety of the vehicle at the time of changing the mode of the shift pattern.

When it is determined that there is no input of the mode switching button by the driver or the vehicle is being driven in step S101, the shift stage controlling unit maintains the mode of the provided shift pattern to the pattern mode (S102).

On the contrary, when it is determined that the mode switching button is input and the vehicle stops at present in step S101, the shift stage controlling unit determines whether a pattern changing button 10 is input (S103). The pattern changing button 10 is an additional button (the button displayed on the touch screen) provided to modify a form of the provided shift pattern, and will be described below in detail.

Since the pattern changing button 10 may be placed adjacent to the mode switching button as illustrated (is not limited thereto), the user may perform the misinput. Accordingly, the shift stage controlling unit determines whether the pattern changing button is input while the mode switching button is input in step S103.

When it is determined that the pattern changing button 10 is input in step S103, the shift stage controlling unit determines that a misoperation occurs to maintain the initial state because both the mode switching button 20 and the pattern changing button 10 are input at the same time (S014).

On the contrary, when it is determined that the pattern changing button 10 is not input in step S103, the shift stage controlling unit determines that the mode switching button 20 is normally input, and converts and provides the shift pattern from the pattern mode (FIG. 7(*a*)) which is in the initial state to the button mode (FIG. 7(*b*)).

In this case, the shift stage controlling unit regards the button mode as the initial state and repeats the step S101.

Meanwhile, in various embodiments of the present invention, when the pattern mode and the button mode are switched by the input of the mode switching button 20, the shift stage controlling unit provides mode switching buttons having different images for the respective modes to display the current mode of the shift pattern.

Figure 10:
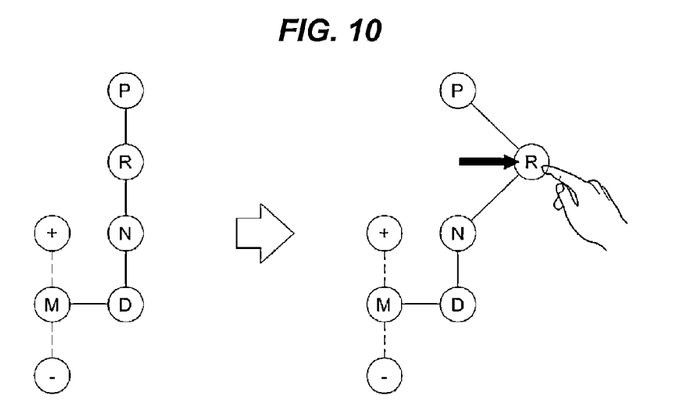
FIG. 10 illustrates an exemplary changing mode of a shift pattern according to the present invention.

FIG. 10 illustrates various embodiments in which a mode of a shift pattern is changed according to various embodiments of the present invention.

The present invention is configured to arbitrarily modify the placement of the shift stage by changing the relative position of each shift stage of the provided shift pattern. In this case, a sequential structure of the respective shift stages which are sequentially placed is maintained (a sequence of the shift stages placed by the sequence of the P, R, N, D, and M stages), but the position where each shift stage is placed may be changeable during a predetermined section.

This process may be achieved by touching and dragging a predetermined shift stage displayed through the touch screen by a user, but the present invention is not limited thereto and any known method of touching a position to be changed after touching the predetermined shift stage may be adopted.

FIG. 10 illustrates various embodiments of changing the positions of the R stage, and the positions of the other P, R, N, and D stages are also changed similarly.

In this case, the sequence of shift stages which are placed sequentially, that is, the sequence of the P, R, N, D, and M may be particularly maintained, and when the position of one of the shift stages is moved, the positions of the adjacent shift stages may be changed together to correspond thereto (the relative positions of the respective shift stages are considered).

In an initial array of the shift stages which are sequentially placed in the sequence of the P, R, N, D, and M as illustrated in FIG. 10, a predetermined shift stage of which the position is to be changed, that is, the R stage is touched and dragged so as to be moved at a set position. In this case, the relative position of the R stage set by the control unit is changed and predetermined values with the shift stages adjacent to the R stage, that is, the P and N stages are changed.

Meanwhile, the + and − stages are placed to be opposite to each other based on the M stage and the placement is, in advance, set at (as?) relative positions of the + and − stages. In various embodiments of the present invention, the relative positions of the + and − stages are set not to be changed, and even though the M stage is moved in any direction, both the + and − stages are moved together to be continuously positioned to be opposite to each other based on the M stage.

Figure 11:
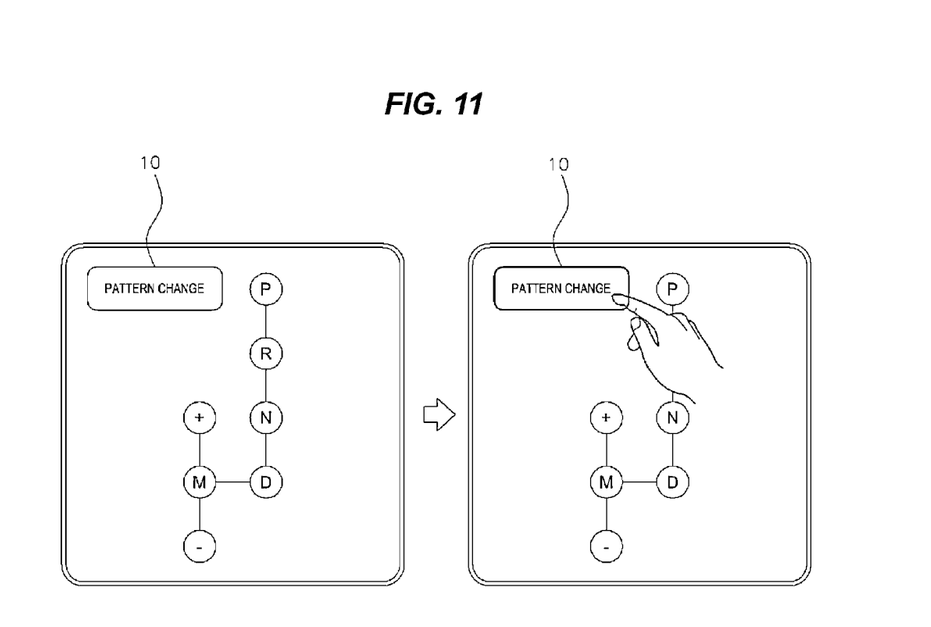
FIG. 11 illustrates an exemplary pattern change button for changing the shift pattern provided on a touch screen is provided.

FIG. 11 illustrates various embodiments in which a pattern change button for changing the shift pattern provided on a touch screen is provided.

As the shift pattern provided through the touch screen, the predetermined shift pattern is provided to induce the user to input the shift pattern, but since the shift pattern is input through the touch screen, physical force is not largely applied in terms of the operation. Accordingly, while operating the shift pattern or even in a general state in which the shift pattern is not operated, there is a possibility that the misinput will occur. Therefore, in order to prevent the predetermined and provided pattern from being changed due to an operation not desired by the driver, which is caused due to the misinput, an additional pattern changing button 10 provided on the touch screen may be further provided.

The pattern changing button 10 is displayed on the touch screen by pattern changing button information provided to the touch screen from the shift stage controlling unit. The pattern changing button information includes an image of the pattern changing button 10 displayed on the touch screen illustrated in FIG. 11 and may include positional information to be displayed together. Accordingly, the pattern changing button 10 is displayed at a predetermined position on the touch screen, and emits light of ON/OFF in the touch input to indicate that the pattern is changeable, and when the touch is input, the control unit controls the shift pattern provided on the touch screen to be changed.

In this case, in various embodiments of the present invention, the shift stage controlling unit may control the pattern to be changed only while the pattern changing button 10 is input. In other words, the driver may modify the pattern form of the shift pattern only while inputting the pattern changing button 10, that is, pressing the pattern changing button 10.

Figure 12:
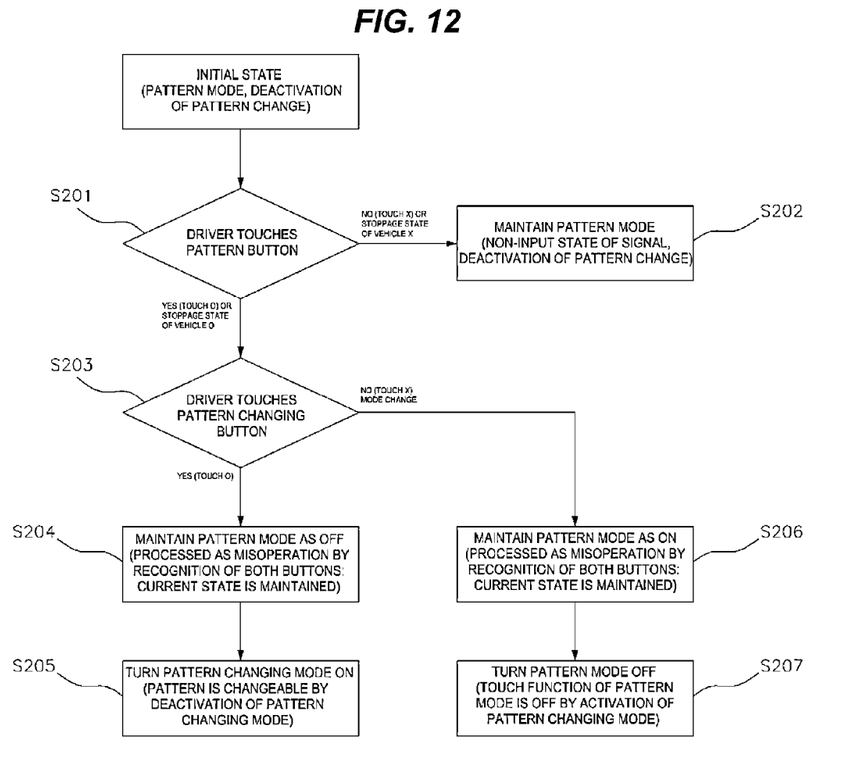
FIG. 12 is a flowchart illustrating an exemplary process of changing the mode of the shift pattern through the pattern change button.

FIG. 12 is a flowchart illustrating a process of changing the mode of the shift pattern through the pattern change button.

Figure 13:
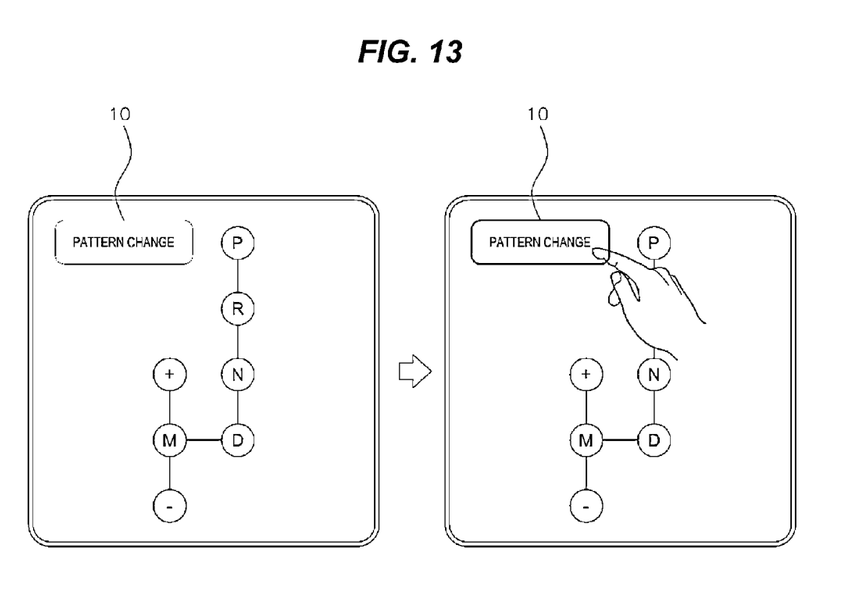
FIG. 13 illustrates an exemplary button mode in ON/OFF of the pattern change button.

As illustrated, in an initial state, a pattern changing button is displayed on a touch screen to stand by an input. In this case, as illustrated in FIG. 13, when the pattern changing button is off, a button form (for example, the pattern changing button having a dark color is provided) may be displayed.

In the initial state, the shift stage controlling unit determines whether a driver inputs the pattern changing button (S201). In this case, it may be determined whether a vehicle stops in order to change a shift pattern only when the vehicle stops.

When it is determined that the driver does not input the pattern changing button or that the vehicle does not stop in step S201, the shift stage controlling unit maintains the shift pattern provided to the touch screen at present as it is (S202).

On the contrary, when it is determined that the pattern changing button is input from the driver while the vehicle stops at present in step S201, the shift stage controlling unit determines whether the driver inputs a mode switching button (S203). It is determined whether the mode switching button 20 is input in order to prevent the change of a shift stage pattern from being activated by a misinput because the pattern changing button 10 and the mode switching button 20 may be placed to be adjacent to each other as described above. Accordingly, it is determined whether the mode switching button is input while the pattern changing button is input in step S203.

When it is determined that the mode switching button 20 is input in step S203, the shift stage controlling unit determines that a misoperation occurs to maintain the initial state, that is, an OFF state of the pattern changing button because both the mode switching button and the pattern changing button are input (S204). Further, since both the pattern changing button 10 and the mode switching button 20 are input, it is determined that the misoperation occurs to also maintain the mode switching button to the initial state, that is, a pattern mode to be displayed (S205).

On the contrary, when it is determined that the mode switching button 20 is not input in step S203, the shift stage controlling unit determines that the pattern changing button 10 is normally input and may change a form of the shift pattern (S206). In this case, as described above, it is continuously determined whether the pattern changing button is input and the form of the shift pattern may be changed only when the pattern changing button is input. Simultaneously, the control unit deactivates the mode switching button, and as a result, even though the mode switching button is thereafter input, the control unit controls the input of the mode switching button to be disregarded (S207).

Figure 14:
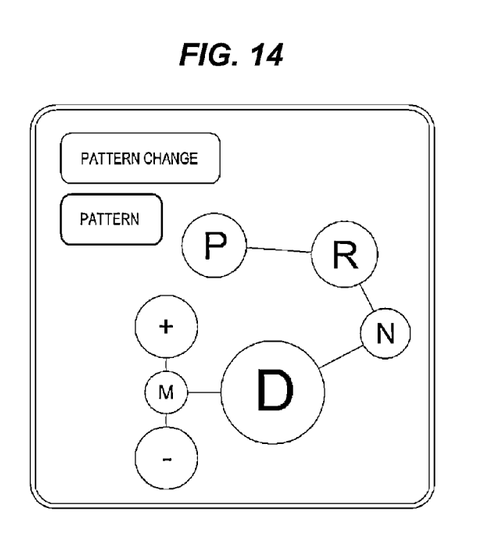
FIG. 14, FIG. 15 and FIG. 16 illustrate exemplary shift patterns.
Figure 15:
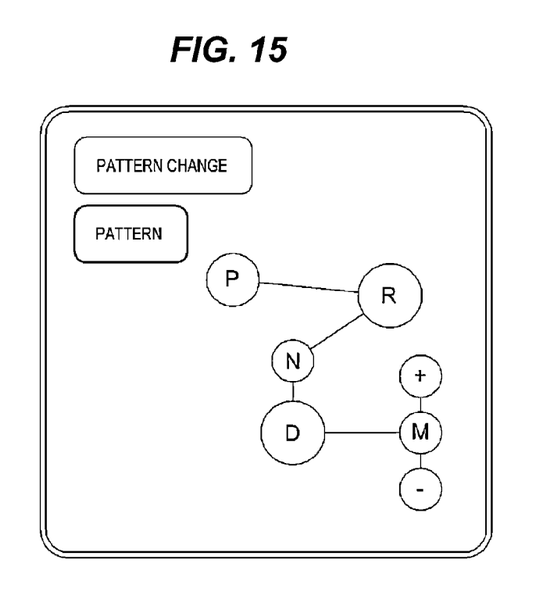
Figure 16:
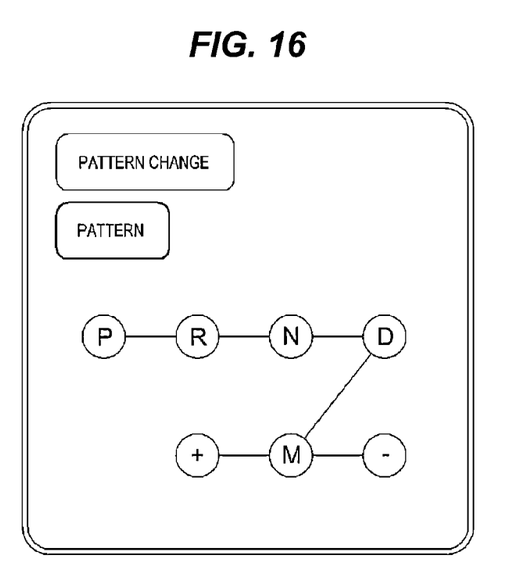

FIGS. 14 to 16 illustrate exemplary shift patterns, which may be modified as above.

As illustrated, the smart touch type electronic auto shift lever of the present invention may modify the shift pattern displayed on the touch screen arbitrarily by touching and modify and use the shift pattern to a form suitable for a user, such as a spherical pattern of FIG. 14, a gate pattern of FIG. 15, and a horizontal pattern of FIG. 16 to improve user convenience.

Figure 17:
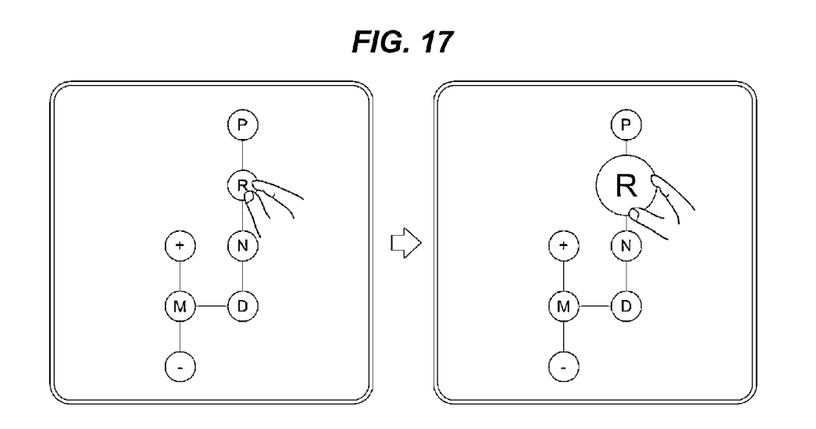
FIG. 17 illustrates exemplary sizes of respective shift stages marked in the shift pattern as are changed.

FIG. 17 illustrates various embodiments in which sizes of respective shift stages marked in the shift pattern are changed.

The present invention is configured to improve readability and operability by changing sizes of shift stages displayed on the touch screen.

The sizes of the shift stages are changed by input on the touch screen, in which the sizes may be changed through inputting two or more plural touch points.

For example, as illustrated in FIG. 17, a predetermined shift stage of which the size is to be changed is touched and input, in which the predetermined shift stage is touched with two fingers and an interval of respective positions where the predetermined shift stage is touched and input is increased to change the size of the shift stage. However, in changing the sizes of the shift stages which are displayed, the present invention is not limited thereto and in any input through the touch screen, the sizes of the shift stage which are set in advance and are displayed may be changed.

Figure 18:
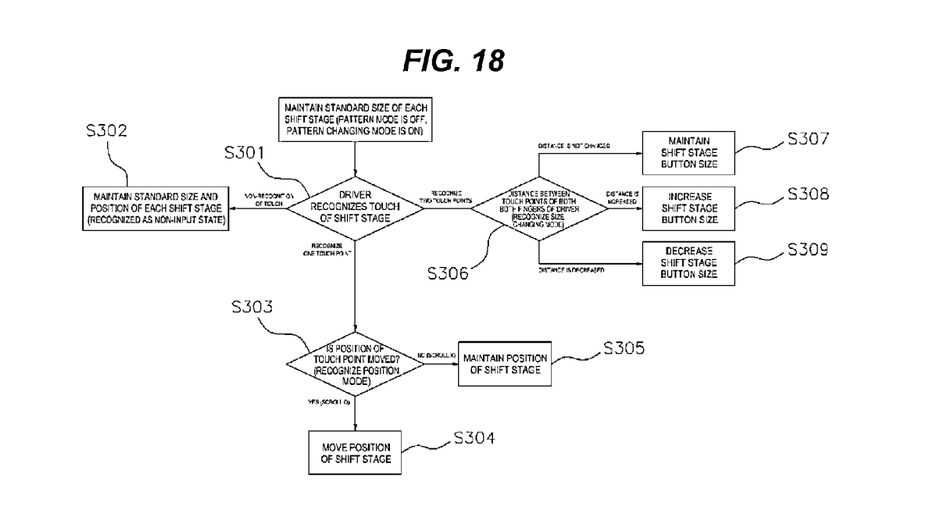
FIG. 18 is a flowchart illustrating an exemplary step of changing the size of the shift stage and changing the position of the shift stage.

The size of the shift stage may be changed and the position of the shift stage is changed to correspond to relative positions of a first input (an input of a predetermined first touch point) and a second input (an input of a predetermined second touch point) input through the touch screen, and this process is illustrated in FIG. 18 (As described above, the size of the shift stage may be changed and the position of the shift stage may be changed only while the pattern changing button is continuously input).

When the pattern changing button is input in the initial state in which a shift pattern set by the shift stage controlling unit in advance is provided to the touch screen, the shift stage controlling unit determines the input through the touch screen (S301).

When the input through the touch screen is not performed in step S301, the shift stage controlling unit does not modify the initially provided shift pattern (S302).

On the contrary, when it is determined that touching one point is recognized, that is, that any one of the first input and the second input is performed in step S301, the shift stage controlling unit determines whether the position of the touch point is moved (S303).

When it is determined that the position of the touch point is moved in step S303, the shift stage controlling unit moves the position of the shift stage corresponding to the position of the touch point to a final position of the touch point (S304). On the contrary, when it is determined that the position of the touch point is not moved in step S303, the shift stage controlling unit does not modify an initially provided shift pattern (S305).

Meanwhile, when it is determined that touching two points is recognized, that is, that both the first input and the second input are input in step S301, the shift stage controlling unit determines whether a distance between the two touch points is changed (S306).

When it is determined that the distance between the touch points of the first input and the second input is not changed in step S306, the shift stage controlling unit does not modify the initially provided shift pattern (S307).

On the contrary, when it is determined that the distance between the touch points of the first input and the second input is changed in step S306, in which the distance between the touch points of the first input and the second input is increased, the shift stage controlling unit increases the size of the shift stage (S308). In this case, the shift stage of which the size is increased may become a shift stage corresponding to the position of any one of the first input and the second input or a shift stage corresponding to a position closest to any one of the first input and the second input.

When it is determined that the distance between the touch points of the first input and the second input is changed in step S306, in which, the distance between the touch points of the first input and the second input is decreased, the shift stage controlling unit decreases the size of the shift stage (S309). In this case, the shift stage of which the size is decreased may become the shift stage corresponding to the position of any one of the first input and the second input or the shift stage corresponding to the position closest to any one of the first input and the second input.

For convenience in explanation and accurate definition in the appended claims, the terms top, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A smart touch type electronic auto shift lever, comprising:
   a touch screen mounted on a console of a vehicle; and
   a shift stage controlling unit that generates shift pattern information and transmits the generated shift pattern information to the touch screen for controlling stage shifting of an electronic auto transmission of the vehicle to correspond to input information input from the touch screen, wherein the shift stage controlling unit previously sets and stores shift stage information including P, R, N, D, M, +, and − stages, positional information including positions where the shift stages included in the shift stage information are to be displayed, and relative positional information among the respective stages, which are included in the shift stage information, the relative positional information being set such that the P, R, N, D, and M stages are sequentially placed, wherein the shift stage controlling unit generates shift pattern information based on the shift stage information, the positional information, and the relative positional information and transmits the generated shift pattern information to the touch screen, wherein the touch screen displays the shift pattern information received from the shift stage controlling unit and transmits input information to the shift stage controlling unit when a touch input occurs, wherein the shift stage controlling unit generates stage shift information allocated corresponding to the input information received from the touch screen and transmits the generated stage shift information to a control unit of the electronic auto transmission of the vehicle, and wherein:
the shift stage controlling unit sets the relative positional information among the shift stages as first relative positional information and second relative positional information in advance;
the shift stage controlling unit sets and stores mode switching button information in advance and provides the mode switching button information to the touch screen;
the touch screen displays a mode switching button based on the mode switching button information; and
the shift stage controlling unit cross-switches the relative positional information to any one of the first relative positional information and the second relative positional information when the mode switching button is input.

2. The smart touch type electronic auto shift lever of claim 1, wherein the shift stage controlling unit generates and outputs stage shift information corresponding to a finally input shift stage only when the input information received from the touch screen is sequentially input according to placement of the shift stage starting from any one of the P, R, N, D, and M stages which are sequentially placed.

3. The smart touch type electronic auto shift lever of claim 1, wherein:
the shift stage controlling unit generates and outputs stage shift information corresponding to the R stage when the P and R stages are sequentially input;
the shift stage controlling unit generates and outputs stage shift information corresponding to the N stage when the P, R, and N stages are sequentially input;
the shift stage controlling unit generates and outputs stage shift information corresponding to the D stage when the P, R, N, and D stages are sequentially input; and
the shift stage controlling unit generates and outputs stage shift information corresponding to the M stage when the P, R, N, D, and M stages are sequentially input.

4. The smart touch type electronic auto shift lever of claim 1, wherein:

the shift stage controlling unit sets and stores pattern changing button information in advance and provides the pattern changing button information to the touch screen;
the touch screen displays the pattern changing button based on the pattern changing button information; and
the shift stage controlling unit controls the shift pattern to be changed when the pattern changing button is input.

5. The smart touch type electronic auto shift lever of claim 4, wherein:
the shift stage controlling unit determines the touch input on the touch screen when the pattern changing button is input;
the shift stage controlling unit moves the position of the shift stage corresponding to the position of an initial touch point to a final position of the touch point when a touch input of one point on the touch screen is present and the position of the corresponding touch point is moved;
the shift stage controlling unit increases the size of the shift stage when determining that touch inputs of two points on the touch screen are present and a distance between respective touch points is increased; and
the shift stage controlling unit decreases the size of the shift stage when determining that touch inputs of two points on the touch screen are present and the distance between respective touch points is decreased.

6. The smart touch type electronic auto shift lever of claim 4, wherein:
the shift stage controlling unit determines the touch input on the touch screen when the pattern changing button is input;
the shift stage controlling unit moves the position of the shift stage corresponding to the position of the initial touch point to the final position of the touch point when the touch input of one point on the touch screen is present and the pattern changing button is continuously input and the position of the corresponding touch point is moved;
the shift stage controlling unit increases the size of the shift stage when determining that touch inputs of two points on the touch screen are present and the pattern changing button is continuously input and the distance between respective touch points is increased; and
the shift stage controlling unit decreases the size of the shift stage when determining that touch inputs of two points on the touch screen are present and the pattern changing button is continuously input and the distance between respective touch points is decreased.

7. A smart touch type electronic auto shift lever, comprising:
a touch screen mounted on a console of a vehicle; and
a shift stage controlling unit that generates shift pattern information and transmits the generated shift pattern information to the touch screen for controlling stage shifting of an electronic auto transmission of the vehicle to correspond to input information input from the touch screen, wherein the shift stage controlling unit previously sets and stores shift stage information including P, R, N, D, M, +, and − stages, positional information including positions where the shift stages included in the shift stage information are to be displayed, and relative positional information among the respective stages, which are included in the shift stage information, the relative positional information being set such that the P, R, N, D, and M stages are sequentially placed, wherein the shift stage controlling unit generates shift pattern information based on the shift stage information, the positional information, and the relative positional information and transmits the generated shift pattern information to the touch screen, wherein the touch screen displays the shift pattern information received from the shift stage controlling unit and transmits input information to the shift stage controlling unit when a touch input occurs, wherein the shift stage controlling unit generates stage shift information allocated corresponding to the input information received from the touch screen and transmits the generated stage shift information to a control unit of the electronic auto transmission of the vehicle, and wherein:
- the shift stage controlling unit sets and stores the pattern changing button information and the mode switching button information in advance and provides the pattern changing button information and the mode switching button information to the touch screen;
- the touch screen displays the mode switching button based on the mode switching button information and displays the pattern changing button based on the pattern changing button information; and
- the shift stage controlling unit determines that the pattern changing button and the mode switching button are not input when both the pattern changing button and the mode switching button are input.

8. The smart touch type electronic auto shift lever of claim 7, wherein the shift stage controlling unit generates and outputs stage shift information corresponding to a finally input shift stage only when the input information received from the touch screen is sequentially input according to placement of the shift stage starting from any one of the P, R, N, D, and M stages which are sequentially placed.

9. The smart touch type electronic auto shift lever of claim 7, wherein:
- the shift stage controlling unit generates and outputs stage shift information corresponding to the R stage when the P and R stages are sequentially input;
- the shift stage controlling unit generates and outputs stage shift information corresponding to the N stage when the P, R, and N stages are sequentially input;
- the shift stage controlling unit generates and outputs stage shift information corresponding to the D stage when the P, R, N, and D stages are sequentially input; and
- the shift stage controlling unit generates and outputs stage shift information corresponding to the M stage when the P, R, N, D, and M stages are sequentially input.

10. The smart touch type electronic auto shift lever of claim 7, wherein:
- the shift stage controlling unit sets the relative positional information among the shift stages as first relative positional information and second relative positional information in advance;
- the shift stage controlling unit sets and stores mode switching button information in advance and provides the mode switching button information to the touch screen;
- the touch screen displays a mode switching button based on the mode switching button information; and
- the shift stage controlling unit cross-switches the relative positional information to any one of the first relative positional information and the second relative positional information when the mode switching button is input.

11. The smart touch type electronic auto shift lever of claim 7, wherein:
- the shift stage controlling unit sets and stores pattern changing button information in advance and provides the pattern changing button information to the touch screen;
- the touch screen displays the pattern changing button based on the pattern changing button information; and
- the shift stage controlling unit controls the shift pattern to be changed when the pattern changing button is input.

12. The smart touch type electronic auto shift lever of claim 7, wherein:
- the shift stage controlling unit determines the touch input on the touch screen when the pattern changing button is input;
- the shift stage controlling unit moves the position of the shift stage corresponding to the position of an initial touch point to a final position of the touch point when a touch input of one point on the touch screen is present and the position of the corresponding touch point is moved;
- the shift stage controlling unit increases the size of the shift stage when determining that touch inputs of two points on the touch screen are present and a distance between respective touch points is increased; and
- the shift stage controlling unit decreases the size of the shift stage when determining that touch inputs of two points on the touch screen are present and the distance between respective touch points is decreased.

13. The smart touch type electronic auto shift lever of claim 7, wherein:
- the shift stage controlling unit determines the touch input on the touch screen when the pattern changing button is input;
- the shift stage controlling unit moves the position of the shift stage corresponding to the position of the initial touch point to the final position of the touch point when the touch input of one point on the touch screen is present and the pattern changing button is continuously input and the position of the corresponding touch point is moved;
- the shift stage controlling unit increases the size of the shift stage when determining that touch inputs of two points on the touch screen are present and the pattern changing button is continuously input and the distance between respective touch points is increased; and
- the shift stage controlling unit decreases the size of the shift stage when determining that touch inputs of two points on the touch screen are present and the pattern changing button is continuously input and the distance between respective touch points is decreased.

* * * * *